March 27, 1956  W. STEIN ET AL  2,739,760
REGISTERING MECHANISM FOR ROLL FILM CAMERAS
Filed Feb. 8, 1955  3 Sheets-Sheet 2
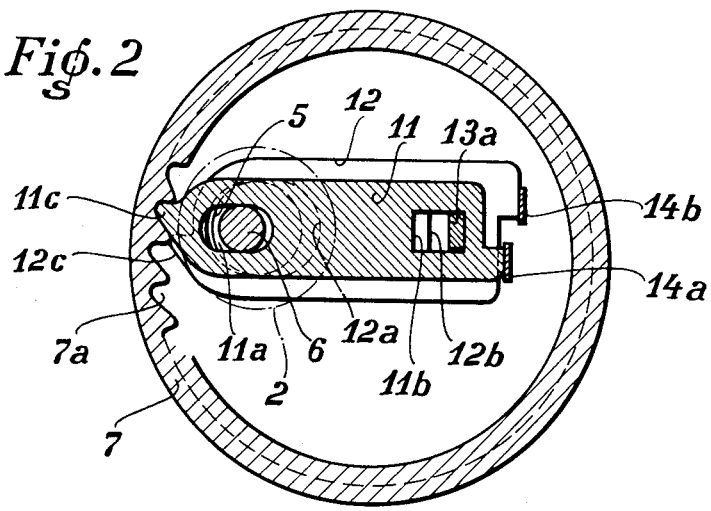
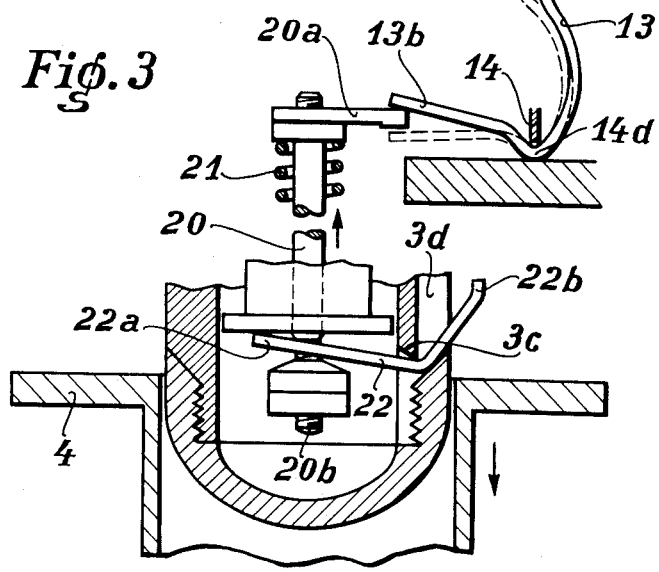

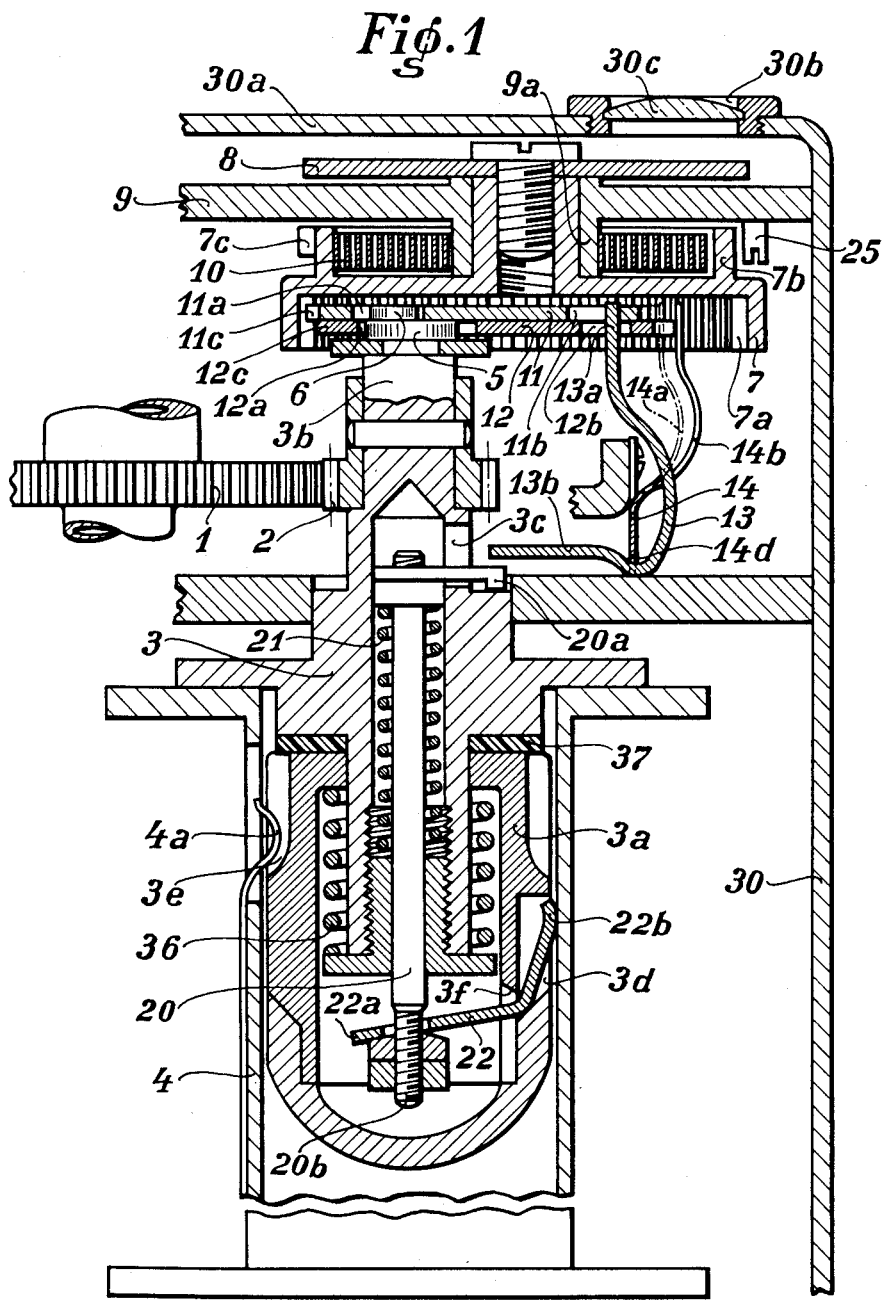

March 27, 1956    W. STEIN ET AL    2,739,760
REGISTERING MECHANISM FOR ROLL FILM CAMERAS
Filed Feb. 8, 1955    3 Sheets—Sheet 3

INVENTOR.
Wilhelm Stein
BY Friedrich Gatt
Benj. T. Rauber
their attorney

United States Patent Office 2,739,760
Patented Mar. 27, 1956

2,739,760

REGISTERING MECHANISM FOR ROLL FILM CAMERAS

Wilhelm Stein, Wetzlar (Lahn), and Friedrich Gath, Altenkirchen under Weilburg, Germany, assignors to Ernst Leitz, G. m. b. H., Wetzlar (Lahn), Germany, a corporation of Germany Application February 8, 1955, Serial No. 486,914

Claims priority, application Germany March 25, 1954

8 Claims. (Cl. 235—91)

Our invention relates to a picture registering or counting mechanism for roll film cameras in which a picture indexing plate driven from the film feeding mechanism is set or cocked by a return spring against whose action it is secured by a disengageable stop.

Picture registering mechanism of roll film cameras are known which may shift back from any position to the starting position upon release of a separable grip. In these arrangements the registering mechanism is moreover returned automatically to its starting position by the action of the return force upon reaching its end position. Registering mechanisms provided with a return spring are moreover known which are actuated by a film driven roll and uncoupled from this roll upon opening the camera cover whereupon the registering mechanism springs back to the starting or zero position.

The first arrangement has the disadvantage that with a smaller number of exposures than is provided on the registering disc, an additional handle is required in order to return the registering mechanism to zero. Neglect of the handle leads consequently to a miscount of the succeeding exposures. In the second arrangement the danger exists that the coupling elements are not satisfactorily engaged upon closing the camera.

It is also known to disconnect the return lock for the registering mechanism through the setting lever actuated for the purpose of reverse winding of the film. In this proposed arrangement the reverse winding lever and the picture registering mechanism are brought in an undesirable manner into interdependent mounting relation, which restricts the freedom of form of construction of the camera. Since for most cameras the film wind-up spool must be removed from the camera for reloading the camera with film (securing the front end of the film to the wind-up spool), our invention provides for uncoupling and coupling the locking of the indexing means upon withdrawing or inserting, respectively, the film winding spool from or into the spool carrier of the camera. Thereby the film registering mechanism is brought into dependence of position relative to the arrangement of the film winding spool, yet without disadvantage since the film wind-up spool as well as the picture registering mechanism is driven through a common film feeding drive and they are thereby interdependent positionally. Also with this sort of arrangement a particularly simple construction of a self-returning registering mechanism is possible, whose structural elements together with the description of further form characteristics of the locking shifting means are illustrated by way of example in the accompanying drawings, in which Fig. 1 is a vertical section of a part of a camera embodying our invention showing the film wind-up spool and the picture registering mechanism and the shifting means in registering position;

Fig. 2 is a horizontal section of an operating pawl and a locking pawl together with a ratchet ring for the picture registering mechanism of the camera in registering position;

Fig. 3 is a simplified view of the shifting and locking means for the picture registering mechanism in reverse running position;

Figure 5:
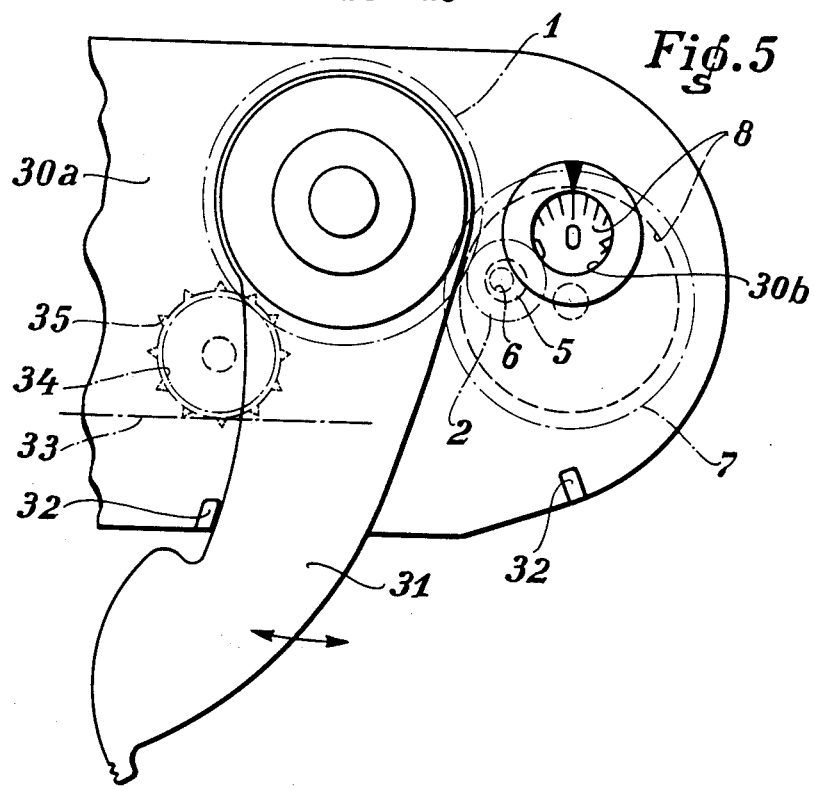
Fig. 5 is a plan view of the camera housing with the viewing window of the picture registering disc and the arrangement of the film feeding means and the registering drive designated.

Referring to Figs. 1 and 5, the invention is illustrated as applied to a camera having a housing 30 on the upper side of which is mounted a film advancing handle 31 movable in a single direction to feed or advance the film. The handle 31 moves a distance fixed for example by the spaced stops 32 to advance the film 33 a distance equal to one picture length. A gear wheel 1 mounted within the camera housing and coupled with the film advancing handle 31 transmits the driving movement of the handle 31 through a pinion 34 to a film transporting roll 35 and through the pinion 2 to the rotating shaft 3 of the film wind-up spool 4. The rotation imparted to the shaft 3 is transmitted to a spool carrier 3a which is mounted on the shaft 3 and is frictionally coupled therewith by means of a spring 36 and a friction disc 37. The friction coupling between the shaft 3 and the spool carrier 3a is necessary to compensate for the varying radius of rotation of the film on the spool 4 as it is wound thereon against the constant rate of advance through the film advancing roll 35. Film advancing arrangements of this sort are known.

Referring to Figs. 1 and 2, in our invention the upper end 3b of the shaft 3 of the spool carrier 3a is provided with a co-axial cylindrical extension 5 and an eccentric 6 both of which extend within the bounds of an internal or inner ratchet wheel 7. The inner ratchet wheel 7 is combined with a picture register disc 8 and is journalled in a plate 9 mounted in the camera housing 30. Between a stationary mounting 9a of the plate 9 and a collar 7b of the ratchet wheel 7 is arranged a return spring 10 fixed at one end to the mounting 9a and at its other end to the collar 7b.

Also within the ratchet wheel 7 are an advancing pawl 11 and a stop pawl 12 mounted to slide in the same direction (Figs. 1–3). The eccentric 6 of the spool carrying shaft 3 fits into an elongated slot 11a of the advancing pawl 11. The cylindrical extension 5 of the spool carrying shaft 3 fits in an elongated slot 12a of the stop pawl 12. Both pawls 11 and 12 have similar openings 11b, 12b, into which one end 13a of a bell crank lever 13 extends. Both pawls 11 and 12 have teeth 11c and 12c, respectively, with which they can engage the inner teeth 7a of the ratchet wheel 7. A leaf spring 14 (Figs. 1, 2 and 4) acts through a spring arm 14a on the pawl 11 and with a spring arm 14b on the pawl 12 and presses the teeth 11c and 12c resiliently into engagement with the teeth 7a of the ratchet wheel 7.

Within the shaft 3 of the spool carrier 3a a slide rod 20 is mounted to slide lengthwise (Figs. 1 and 3). It is subject to the action of a pressure spring 21. At its upper end 20a the slide rod 20 extends through an opening 3c of the shaft 3 and acts on the lever arm 13b of the bell crank lever 13. At its lower end 20b the slide rod 20 acts on the lever arm 22a of another bell crank lever 22, the other arm 22b of which can tilt through an opening 3d of the spool carrier 3a into operative engagement with a film wind-up spool 4 slidable onto the spool carrier 3a. When a spool 4 is slid onto the spool carrier 3a, the lever 22 in combination with the pressure spring 21 at the same time serves as a retaining friction for a friction determined mounting of the spool 4 on the spool carrier 3a to prevent inadvertent falling off of the spool. The spool can also be provided with an engaging catch 4a, spring fastened for example, in an opening 3e in the spool carrier 3a which insures the transmission of the rotation of the spool carrier 3 to the film wind-up spool 4 and therefore whose drive is dependent only on the strength of friction of the friction coupling 36, 37.

The operation of the apparatus is as follows:

A spool 4 is slid onto the spool carrier 3a. The positioning of the feeding means and of the register driving means results as in Fig. 1. When the film is to be fed forwardly the winding shaft 3 and the spool carrier 3a are rotated by the gear 1 and pinion 2. This rotation is transmitted to the spool 4, for example, by the catch 4a. At the same time the eccentric 6 rotates with the shaft 3. Thereupon the driving pawl 11 imparts to the pawl 11a to-and-fro movement corresponding to the path of the eccentric 6 whereupon it first falls back yieldingly over a tooth of the ratchet wheel 7 and after falling into the next space in the ratchet 7 shifts the ratchet forwardly one tooth length. The tooth 12 of the stop pawl remains in engagement with a serration 7a of the ratchet 7, thereby preventing a reverse turning of the ratchet 7 under the action of the return spring 10, until the driving tooth 11c has engaged a new tooth of the ratchet. Upon further rotation of the ratchet 7 the lock pawl 12 first withdraws against its spring tension out of a ratchet serration until the pawl tooth 12c can fall into the next serration.

With this feeding movement the return spring 10 is further tensioned to a corresponding extent. This operation may be repeated as often as desired whereby with each film advancing step the ratchet 7 is further advanced one tooth. However, the number of possible successive film advancing steps is limited by means of final and return stops 25 in combination with a projection 7c of the ratchet wheel 7.

When the film supply has been wound on the wind-up spool 4 or if for other reasons another film is to be inserted, the film on the wind-up spool is first spooled back, for example, into the magazine in known manner. To secure a new film attachment, the wind-up spool 4 is withdrawn from the spool carrier 3a. Thereby the lever arm 22b of the bell crank lever 22 is set free so that the spring 21 acting on the shifting rod 20 rotates it about the fulcrum knife edge 3f in the recess 3d of the spool carrier 3a out of the recess 3d (Fig. 3).

Figure 4:
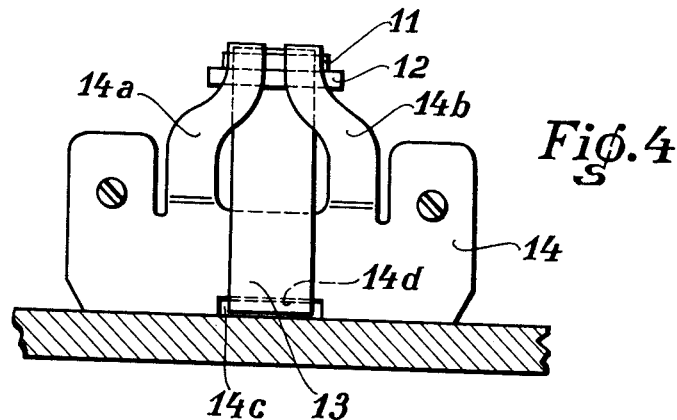
Fig. 4 is a side elevation of the spring and shifting lever acting on the pawl.

The shifting rod 20 is shifted upwardly at the same time by the compression spring 21 whereby the end 20a of the shifting rod acts on the lever arm 13b and tilts it about the fulcrum edge 14d formed in the opening 14c of the spring 14 (Figs. 1, 3 and 4). The other lever arm of the bell crank lever 13 thereby acts equally on both pawls 11 and 12 and withdraws the teeth 11c and 12c from engagement with the teeth 7a of the ratchet wheel overcoming the action of the spring arms 14a and 14b. The pawls 11 and 12 are guided in this movement by means of the elongated slots 11a and 12a respectively, receiving the eccentric 6 and the cylinder extension 5. When the teeth 11c and 12c have been withdrawn from engagement with the recesses of the ratchet 7, the ratchet and the register disc 8 connected to it are rotated in reverse by the return spring 10 tensioned by them, whereupon this reversing continues until either—for lack of a return limiting stop—the spring 10 is completely untensioned or—with the provision of a return limit stop—until contact with stop bolsters 25.

When the wind-up spool 4 is again slid onto the spool carrier 3a the lever arm 22 rotates again into the recess 3d whereupon the lever arm 22a compresses the compression spring 21 through the rod end 20b, shifting rod 20 and rod end 20a. The action of the compression spring 21 on the bell crank lever 13 thereupon ceases so that the stop pawl again comes into engagement with the serrations 7a of the ratchet wheel under the action of the spring arms 14a and 14b with simultaneous withdrawal of the bell crank lever 13. The register disc 8 takes part in the feeding and return movements of the ratchet wheel 7. The indicia of the register are readable through a window 30b mounted eccentrically to the axis of rotation of the register disc. A magnifying glass 30c set into the window opening facilitates the reading of the disc and also closes the opening 30b of the housing wall tightly against dust and water.

Having described our invention, what we claim is:

1. Picture counting mechanism for roll film cameras which comprises a film advancing means, a picture counting register driven by said film advancing means, a return spring acting to return said register to zero position, a releasable latch securing said register against the return action of said spring, a film wind-up spool carrier on which a wind-up spool may be mounted and from which it may be removed and means actuated by a spool mounted on said carrier to hold said latch in securing position and to release said latch when said spool is removed from said carrier.

2. The picture counting mechanism of claim 1 in which said means comprises a ratchet wheel rotated with said register, a spring pressed pawl engaging said ratchet and a lever mechanism actuated by a spool on said carrier to withdraw said latch from engagement with said ratchet.

3. The picture counting mechanism of claim 1 having a hand operated ratchet to advance said picture register, a spring actuated pawl to hold said ratchet against return movement by said return spring, a spring actuated lever to withdraw said pawl from engagement with said ratchet and means actuated by the mounting of a spool on said carrier to tilt said spring actuated lever against said spring action to permit said pawl to engage said ratchet.

4. The picture counting mechanism of claim 1 in which said lever is actuated by a spring pressed sliding rod in said carrier to actuate said lever and said means actuated by the mounting of a spool on said carrier comprises a lever on said carrier engaging said sliding rod and having an arm projecting into the path of the spool being mounted on said carrier and tiltable by the spool to shift said rod against its spring action.

5. Picture counting mechanism for roll film cameras which comprises a picture counting register disc, a hand operable rotatable shaft having a lengthwise extension eccentric to the axis of rotation of said shaft, a ratchet wheel connected to drive said register disc, a driving pawl spring pressed to engage said ratchet and driven by said eccentric extension to advance said ratchet step by step for each rotation of said shaft, a return spring to return said ratchet to starting position, a holding pawl spring pressed to engage said ratchet and prevent return of said ratchet by said return spring, a wind-up spool carrier mounted on said shaft to rotate therewith, a pawl disengaging lever, a sliding rod slidably mounted on said carrier, a spring on said carrier pressing said rod to engage and tilt said pawl disengaging lever to withdraw said pawls from engagement with said ratchet and permit said return spring to return said ratchet and register disc to starting position, and an actuating lever mounted on said carrier having one arm projecting beyond the spool carrying surface of said carrier to be tilted by a spool mounted on said carrier to withdraw said rod against the action of its spring from its lever tilting position.

6. The picture counting mechanism of claim 5 in which said ratchet comprises a cylindrical flange having ratchet teeth on its inner periphery and in which said eccentric extension and said pawls are mounted within said inner periphery.

7. The picture counting mechanism of claim 6 in which said driving pawl has an elongated slot to slidably receive and engage said eccentric extension and said holding pawl has an elongated slot to slidably receive and engage said shaft.

8. The picture counting mechanism of claim 5 in which the sliding rod is mounted co-axially within the rotatable shaft and in which the actuating lever is a bent lever fulcrumed in the wall of the carrier and has one arm engaging the slidable rod and the other arm extending at an angle to, and through, the mounting surface of the carrier.

No references cited.